(12) United States Patent
Kovac (10) Patent No.: US 9,079,257 B2
(45) Date of Patent: Jul. 14, 2015

(54) INDEXABLE CUTTING INSERT FOR MACHINING COMPOSITE MATERIALS

(71) Applicant: Kennametal Inc., Latrobe, PA (US)

(72) Inventor: Jeffrey Francis Kovac, Loyalhanna, PA (US)

(73) Assignee: KENNAMETAL INC., Latrobe, PA (US)

( * ) Notice: Subject to any disclaimer, the term of this patent is extended or adjusted under 35 U.S.C. 154(b) by 192 days.

(21) Appl. No.: 13/751,678

(22) Filed: Jan. 28, 2013

(65) Prior Publication Data

US 2014/0212231 A1   Jul. 31, 2014

(51) Int. Cl.
*B23C 5/00*  (2006.01)
*B23C 5/20*  (2006.01)
*B23C 5/02*  (2006.01)

(52) U.S. Cl.
CPC .............. *B23C 5/205* (2013.01); *B23C 5/207* (2013.01); *B23C 2200/0455* (2013.01); *B23C 2200/081* (2013.01); *B23C 2200/086* (2013.01); *B23C 2200/206* (2013.01); *B23C 2200/283* (2013.01); *B23C 2200/286* (2013.01); *B23C 2210/045* (2013.01); *B23C 2210/0428* (2013.01); *B23C 2226/27* (2013.01); *Y10T 407/235* (2015.01)

(58) Field of Classification Search
CPC ................... B23C 2210/088; B23C 2200/08; B23B 2200/205; B23B 2200/20; B23B 2200/08
USPC ........................................................ 407/113
See application file for complete search history.

(56) References Cited

U.S. PATENT DOCUMENTS

| | | | |
|---|---|---|---|
| 4,794,665 A | 1/1989 | Peters | |
| 7,455,482 B2 | 11/2008 | Lundvall | |
| 8,246,278 B2 | 8/2012 | Horiike et al. | |
| 2012/0195700 A1 | 8/2012 | Chen et al. | |

*Primary Examiner* — Will Fridie, Jr.
(74) *Attorney, Agent, or Firm* — Larry R. Meenan (57) ABSTRACT

An indexable cutting insert includes a top surface, a bottom surface, a plurality of peripheral side surfaces, and a plurality of cutting edges formed at an intersection between said top surface and plurality of side surfaces. A plurality of triangular-shaped serrations are positioned along the cutting edges, each serration comprising an apex and a pair of side surfaces that meet at a vertex. The serrations provide the cutting edges with both a positive axial rake angle and a negative axial rake angle, thereby reducing delamination when machining a composite material.

19 Claims, 8 Drawing Sheets

INDEXABLE CUTTING INSERT FOR MACHINING COMPOSITE MATERIALS

BACKGROUND OF THE INVENTION

The invention relates in general to a cutting insert that may be detachably mounted on a tool holder for cutting a work piece, and in particular to an indexable cutting insert having both positive and negative axially raked cutting edges for machining composite materials and the like.

Composite materials, such as fiber reinforced plastic (FRP) materials and the like, are widely used in aerospace industry due to its high specific strength and high specific stiffness. FRP materials are composite materials consisting of soft resin matrix and high strength fiber reinforcement. Typical fiber reinforcements include carbon fibers (CFRP), glass fibers (GFRP), Kevlar fibers, and the like. FRP materials are often processed into a laminated structure. FRP materials have excellent in-plane strength, but low inter-laminar strength. Unfortunately, it has been found that FRP materials tend to delaminate during machining using cutting inserts having only a positive axially raked cutting edge.

SUMMARY OF THE INVENTION

The problem of delamination during machining of composite materials has been solved by providing an indexable cutting insert having a plurality of cutting edges, each cutting edge with a plurality of serrations that provide the cutting edges with both positive and negative axial rake angles.

In one aspect of the invention, an indexable cutting insert for machining composite materials comprises a top surface, a bottom surface and a plurality of peripheral side surfaces, said top and bottom surfaces and said peripheral side surfaces being joined to form cutting corners, the top surface having a rake face and a central plateau; a plurality of cutting edges formed at an intersection between said top surface and plurality of side surfaces; and a plurality of triangular-shaped serrations positioned along the cutting edges, each serration comprising an apex and a pair of side surfaces that meet at a vertex, the cutting edge comprising a base of each triangular-shaped serration, wherein the serrations on the cutting insert provide the cutting edges with both a positive axial rake angle and a negative axial rake angle, thereby reducing delamination when machining a composite material.

In another aspect of the invention, an indexable cutting insert for machining composite materials comprises a top surface, a bottom surface and a plurality of peripheral side surfaces, said top and bottom surfaces and said peripheral side surfaces being joined to form cutting corners, the top surface having a rake face and a central plateau; a plurality of cutting edges formed at an intersection between said top surface and plurality of side surfaces; and a plurality of triangular-shaped serrations positioned along the cutting edges, each serration comprising an apex and a pair of side surfaces that meet at a vertex, the cutting edge comprising a base of each triangular-shaped serration, wherein each cutting edge has an equal number of serrations, and wherein each serration is substantially identical to each other, and wherein the serrations on the cutting insert provide the cutting edges with both a positive axial rake angle and a negative axial rake angle, thereby reducing delamination when machining a composite material.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Referring now to FIGS. 1-9, an indexable cutting insert 10 is shown according to an embodiment of the invention. In general, the cutting insert 10 is generally square in shape (when viewed from the top) having symmetry about the x-axis and the y-axis. Thus, the cutting insert 10 can be indexed by rotating the cutting insert 10 ninety (90) degrees about the z-axis to present a different cutting edge to the workpiece (not shown). It will be appreciated that a generally square-shaped cutting insert is illustrated, the principles of the invention described below can be applied to a cutting insert having any polygonal shape, such as a trigon, a diamond, a pentagon, a hexagon, and the like.

Figure 3:
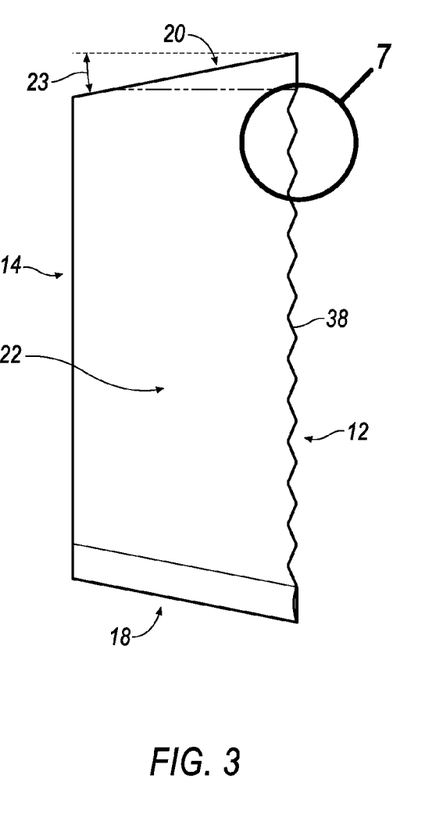
FIG. 3 shows a side view of the indexable cutting insert of FIG. 1.
Figure 4:
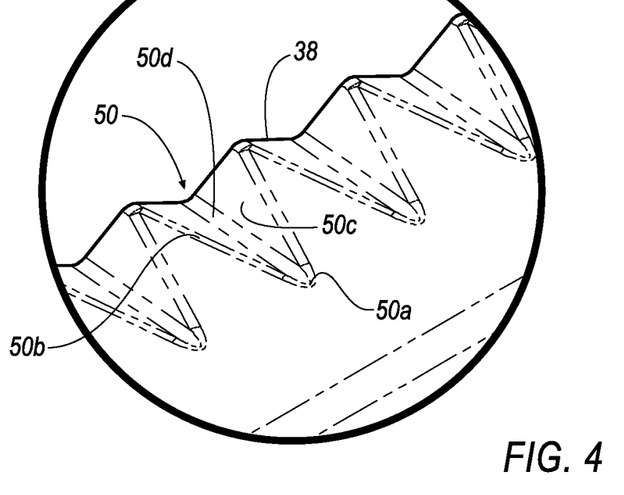
FIG. 4 shows an enlarged perspective view of the serrations along the cutting edge of the cutting insert of FIG. 1.

The cutting insert 10 has substantially parallel top and bottom surfaces 12, 14, respectively, and peripheral side surfaces 16, 18, 20, 22. The side surfaces 16, 18, 20, 22 are formed at a clearance angle 23 with respect to a plane perpendicular to the top and bottom surfaces 12, 14, as shown in FIG. 3. In one embodiment, the clearance angle 23 can be between about zero (0) degrees and about thirty (30) degrees. For example, the clearance angle 23 can be about fifteen (15) degrees.

Figure 1:
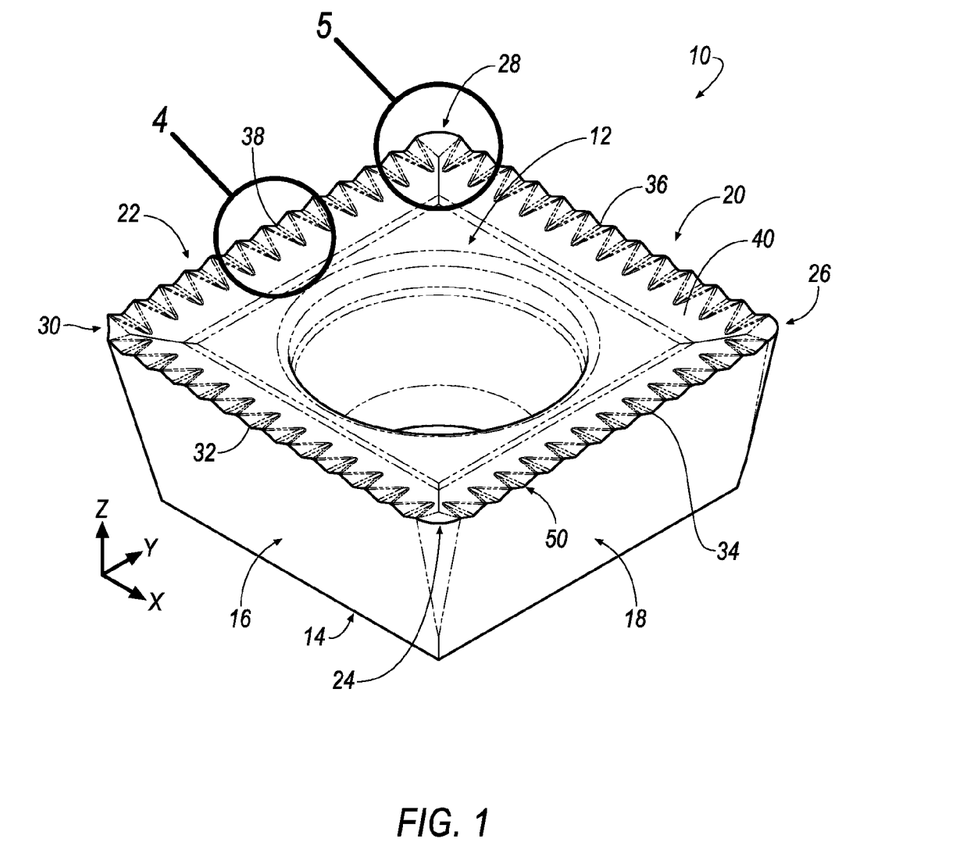
FIG. 1 shows a perspective view of an indexable cutting insert with serrations according to an embodiment of the invention.
Figure 2:
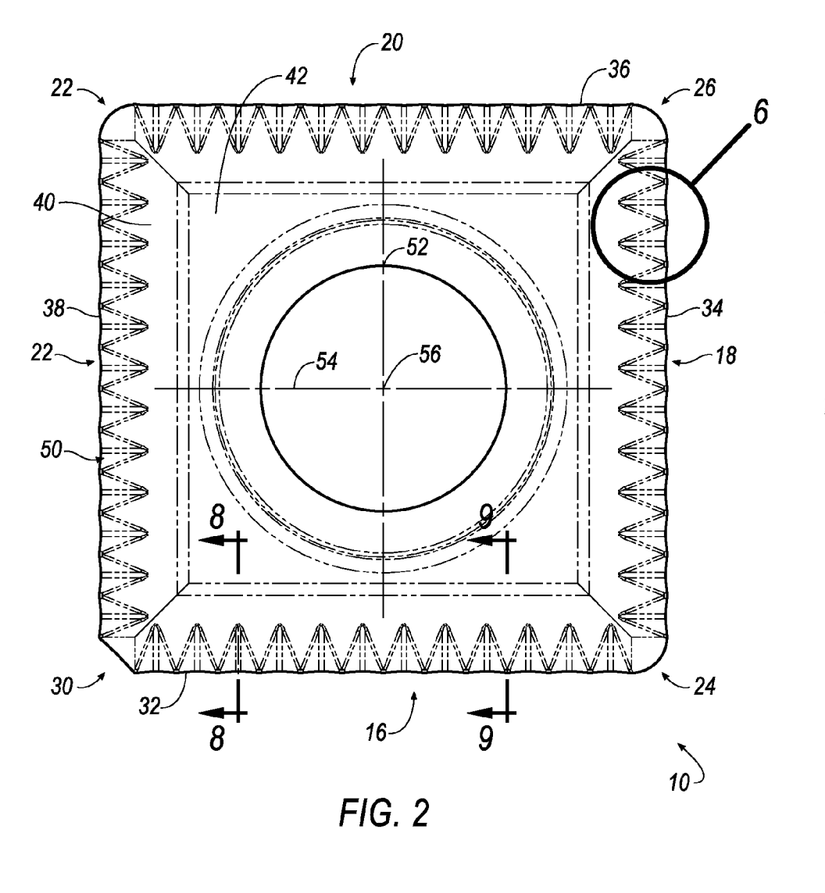
FIG. 2 shows a top view of the indexable cutting insert of FIG. 1.
Figure 5:
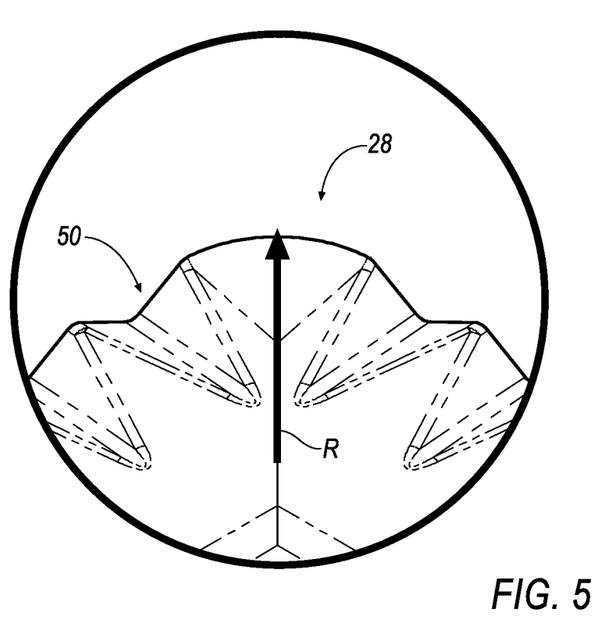
FIG. 5 shows an enlarged perspective view of the serrations proximate the cutting corner of the cutting insert of FIG. 1.

The cutting insert 10 also has four cutting corners 24, 26, 28, 30 formed at the intersection between each of the side surfaces 16, 18, 20, 22 and the top surface 12. In one embodiment, one or more of the cutting corners 24, 26, 28 30, for example, the cutting corners 24, 26, 28 may be formed with a nose radius having a radius of curvature, R, of about between 0.016 inch (0.4 mm) to about 0.047 inch (1.2 mm), for example, about 0.0315 inch (0.8 mm), as shown in FIG. 5. In another embodiment, one or more of the cutting corners 24, 26, 28, 30, for example, the cutting corner 30 may be formed with a 45° chamfer instead of a nose radius, as shown in FIG. 2.

Figure 9:
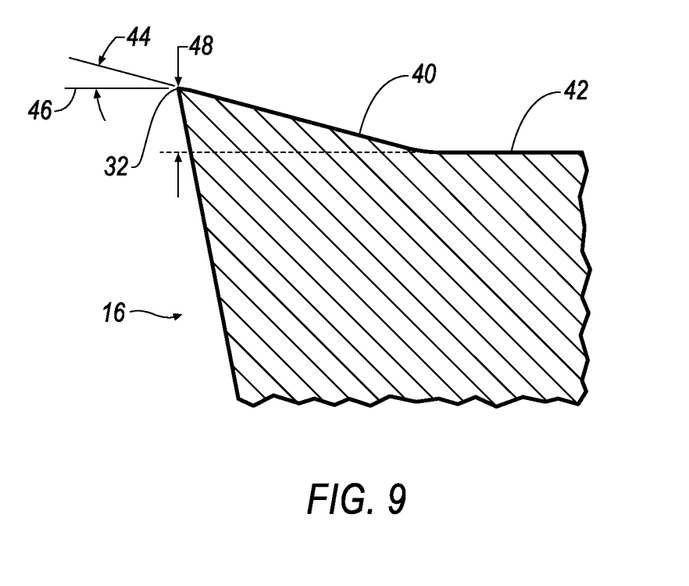
FIG. 9 shows a cross-sectional view of the cutting insert taken along line 9-9 of FIG. 2.

A plurality of cutting edges 32, 34, 36, 38 are formed at the intersection between the top surface 12 and the side surfaces 16, 18, 20, 22. In the illustrated embodiment, the cutting edges 32, 36 are substantially parallel to each other, while the cutting edges 34, 38 are substantially parallel to each other. In addition, the top surface 12 has a rake face 40 that extends entirely around the periphery of the cutting insert 10. The rake face 40 extends inwardly and downwardly from the corners 24, 26, 28, 30 and the cutting edges 32, 34, 36, 38 to a substantially planar central plateau 42 at an angle 44 with respect to a plane 46 parallel to the top surface 12, as shown in FIG. 9. In one embodiment, the angle 44 is in a range between about five (5) degrees to about twenty-five (25) degrees. For example, the angle 44 can be about fifteen (15) degrees. A difference in elevation between the central plateau 42 and the cutting edge 32, 34, 36, 38 defines a depth 48 between the cutting edge 32, 34, 36, 38 and the central plateau 42. In one embodiment, the depth 48 is in a range between about 0.011 inch (0.28 mm) to about 0.019 inch (0.49 mm).

One aspect of the invention is that the cutting insert 10 includes a plurality of serrations, shown generally at 50, formed in the rake face 42 and extending radially inward from each cutting edge 32, 34, 36, 38 of the cutting insert 10. It is intended that the serrations 50 are similarly formed and the following description of a single serration 50 is applicable to the formation of other scallops.

Figure 6:
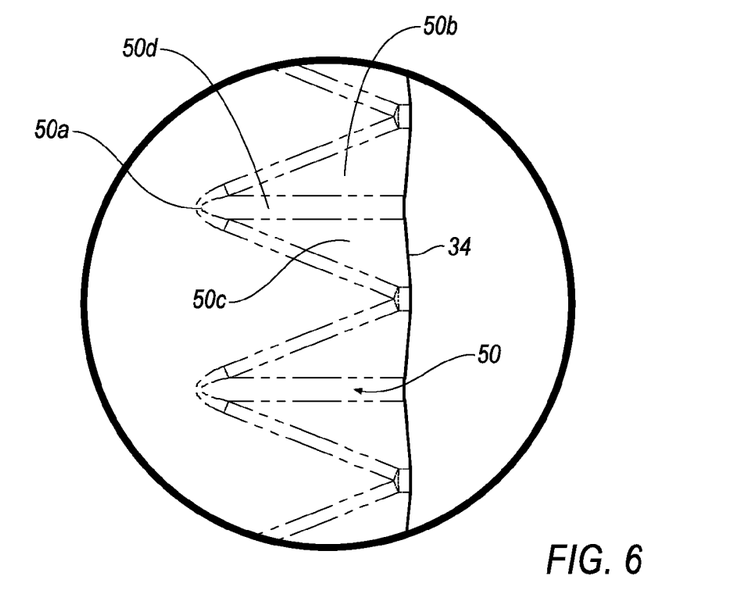
FIG. 6 shows another enlarged top view of the serrations along the cutting edge of the cutting insert of FIG. 1.
Figure 7:
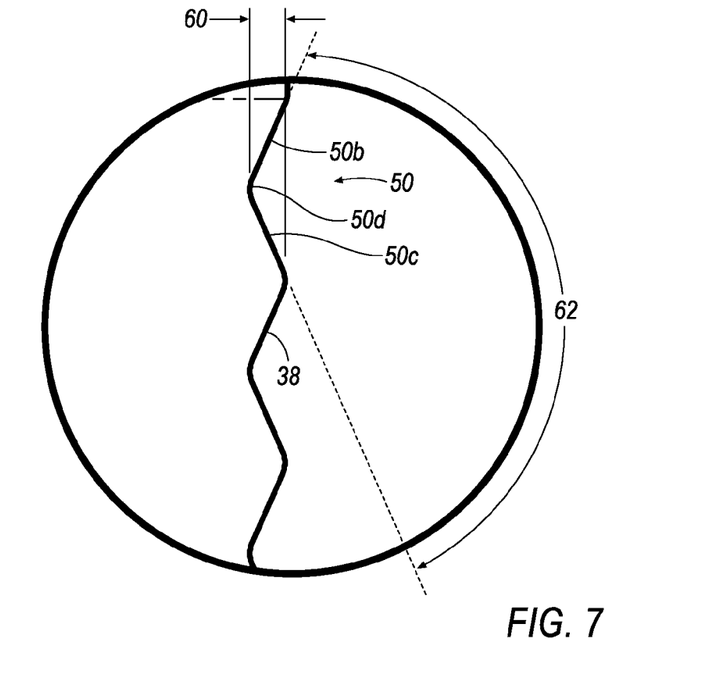
FIG. 7 shows an enlarged side view of the serrations along the cutting edge of the cutting insert of FIG. 1.

Each serration 50 is generally triangular-shaped having an apex 50a and a pair of side surfaces 50b, 50c that meet at a vertex 50d, as shown in FIG. 6. In the illustrated embodiment, each serration 50 is in the form of an isosceles triangle with the cutting edge 32, 34, 26, 28 comprising the base of the serration 50. It will be appreciated that the invention is not limited to a specific shape of the triangle, and that the invention can be practiced with any desirable triangular shape, such as an equilateral triangle, an oblique triangle, an acute triangle, an obtuse triangle, and the like. As is known in the art, the altitude (or height) of each serration 50 is a straight line through the vertex and perpendicular to the base (or cutting edge 32, 34, 36, 38). The side surfaces 50b, 50c are formed at an angle 62 with respect to each other, as shown in FIG. 7. The angle 62 is in a range between about 110 degrees to about 160 degrees. In one embodiment, the angle 62 is about 132 degrees. The vertex 50d that may be formed with a radius for ease of manufacture.

In the illustrated embodiment, each cutting edge 32, 34, 36, 38 has an equal number of serrations 50. Because the serrations 50 are substantially identical to each other, a bisector 52, 54 passing through a central axis 56 that equally divides the cutting edges 32, 34, 36, 38 will pass between two serrations 50, thereby dividing the cutting edges 32, 34, 36, 38 into two equal number of serrations 50, as shown in FIG. 2. For example, there are six (6) serrations 50 on each side of the bisector 52 dividing the cutting edges 32, 36, and there are six (6) serrations 50 on each side of the bisector 54 dividing the cutting edges 34, 38.

It will be appreciated that the invention is not limited by the total number of serrations 50 along each cutting edge 32, 34, 36, 38, and that the invention can be practiced with any desired number of serrations along each cutting edge, so long as each cutting edge 32, 34, 36, 38 has the same number of serrations (50). For example, the cutting insert 10 can have ten (10) serrations along each cutting edge 32, 34, 36, 38, instead of twelve (12) serrations as shown in the illustrated embodiment.

Figure 8:
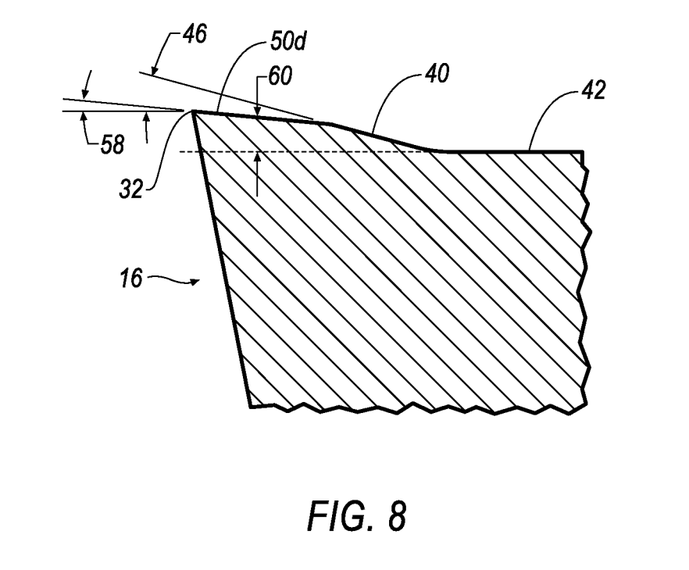
FIG. 8 shows a cross-sectional view of the cutting insert taken along line 8-8 of FIG. 2.

The vertex 50d of each serration 50 extends inwardly and downwardly from the cutting edges 32, 34, 36, 38 toward the central plateau 42 at an angle 58 with respect to the plane 46 parallel to the top surface 12, as shown in FIG. 8. In one embodiment, the angle 58 is in a range between about one (1) degree to about ten (10) degrees. For example, the angle 58 can be about five (5) degrees. A difference in elevation between the peak and the valley of each serration 50 defines a depth 60. In one embodiment, the depth 60 is in a range between about 0.007 inch (0.19 mm) to about 0.017 inch (0.25 mm). For example, the depth 60 can be about 0.012 inch (0.3 mm). It is noted that the depth 60 of the serration 50 is less than the depth 48 of the rake face 42.

It will also be appreciated that the invention is not limited by the depth 60 of each serration 50 and the angle 62 of the side walls 50b, 50c, and that the invention can be practiced with any desirable angle and depth, depending on the number of serrations 50 along the cutting edge 32, 34, 36, 38. The depth 60 and the angle 62 of the serrations 50 can be controlled in two ways. First, if the depth 60 of the serration 50 is held constant, the angle 62 will vary depending on the number of serrations (the angle 62 will become smaller with more serrations). Second, if the angle 62 is held constant, then the depth 60 will vary depending on the number of serrations (the depth 60 will decrease with more serrations).

Figure 10:
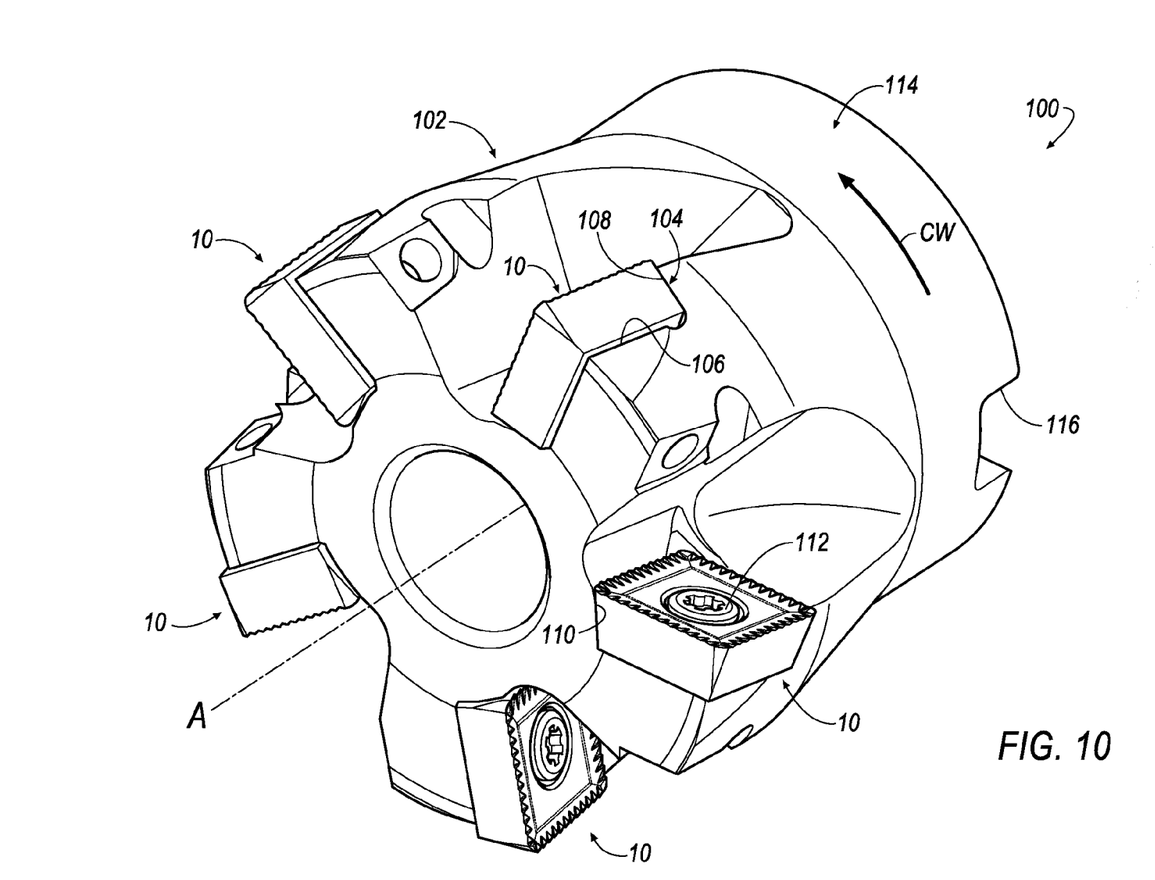
FIG. 10 shows a perspective view of the cutting insert of FIG. 1 mounted in a milling cutter.
Figure 11:
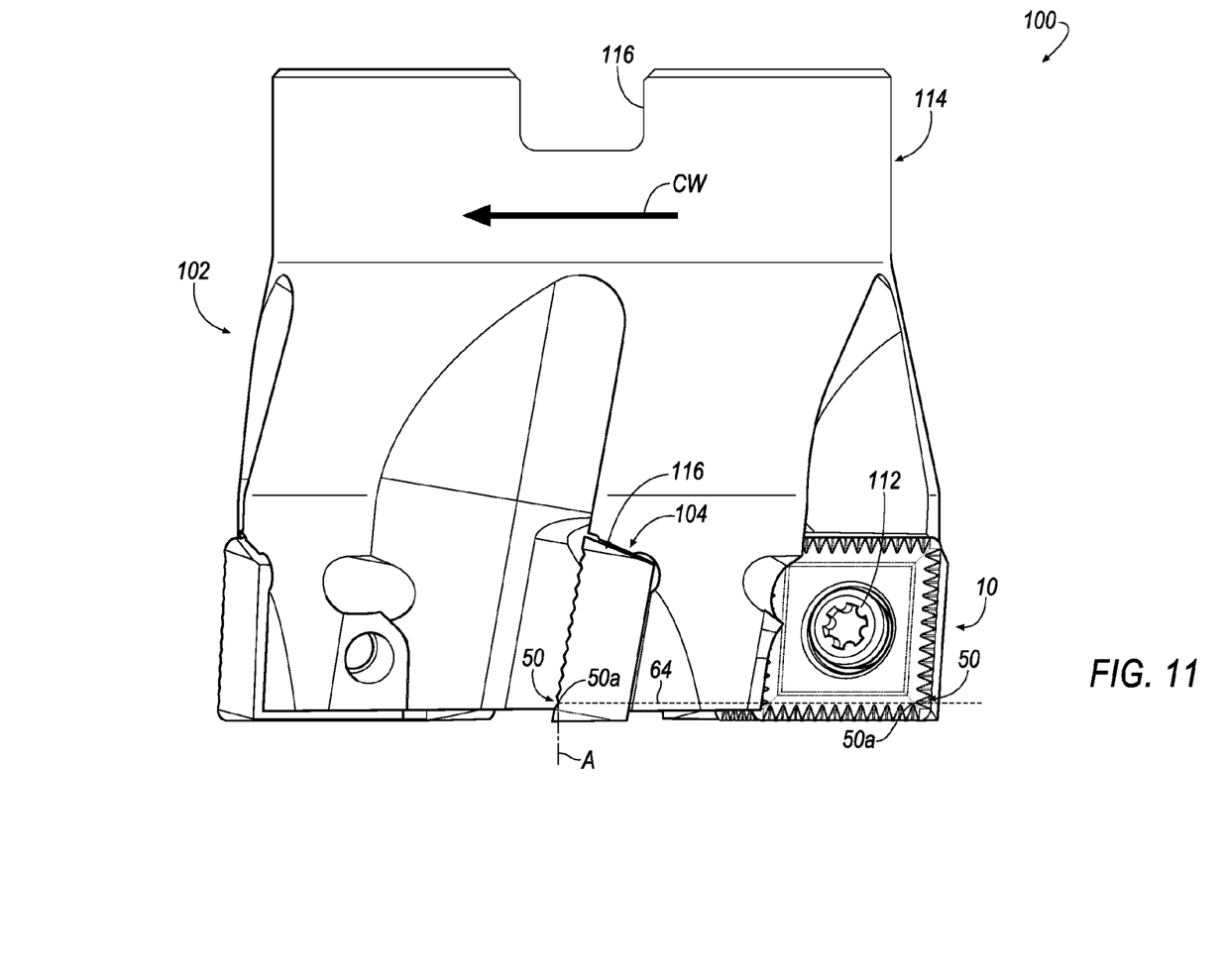
FIG. 11 shows a side view of the cutting insert of FIG. 1 mounted in the milling cutter of FIG. 10.

Referring now to FIGS. 10 and 11, a milling cutter is shown generally at 100. The milling cutter 100 has a cutter body 102 with one or more pockets 104 therein. The pockets 104 in the illustrated cutter body 102 are arranged axially and circumferentially in an angularly spaced relation to each other. Each pocket 104 is capable of receiving the cutting insert 10 of the invention. Each pocket 104 comprises a substantially planar seat or base 106 and two shoulders 108, 110. The relative angles formed by the shoulders 108, 110 with respect to the base 106 and to each other are not important to the invention, and can be formed at any desirable relative angle. Each shoulder 108, 110 provides a surface that abuts a corresponding side surface 16, 18, 20, 22 of the cutting insert 10. The cutting insert 10 is secured within each pocket 104 by means of a fastening screw 112. The fastening screw 112 forces the cutting insert 10 towards the base 106 and shoulders 108, 110 of the pocket 104 via the head of the fastening screw 112. Consequently, the cutting insert 10 is attached to the cutter body 102 in a detachable or removable manner.

In the illustrated embodiment, the cutter body 102 is adapted to be mounted to the spindle of a milling machine (not shown) via a tool holder adapter 114. The cutter body 102 has a machine engaging end which has opposing drive keys 116. The cutter body 102 is rotated about a rotary axis A in a counter-clockwise direction, indicated by the directional arrow CW shown in FIG. 10, to cut a workpiece (not shown). It should be appreciated that the tool holder adapter 114 shown is provided only for illustrative purposes. The tool holder adapter 114 may be any suitable tool holder adapter.

Figure 12:
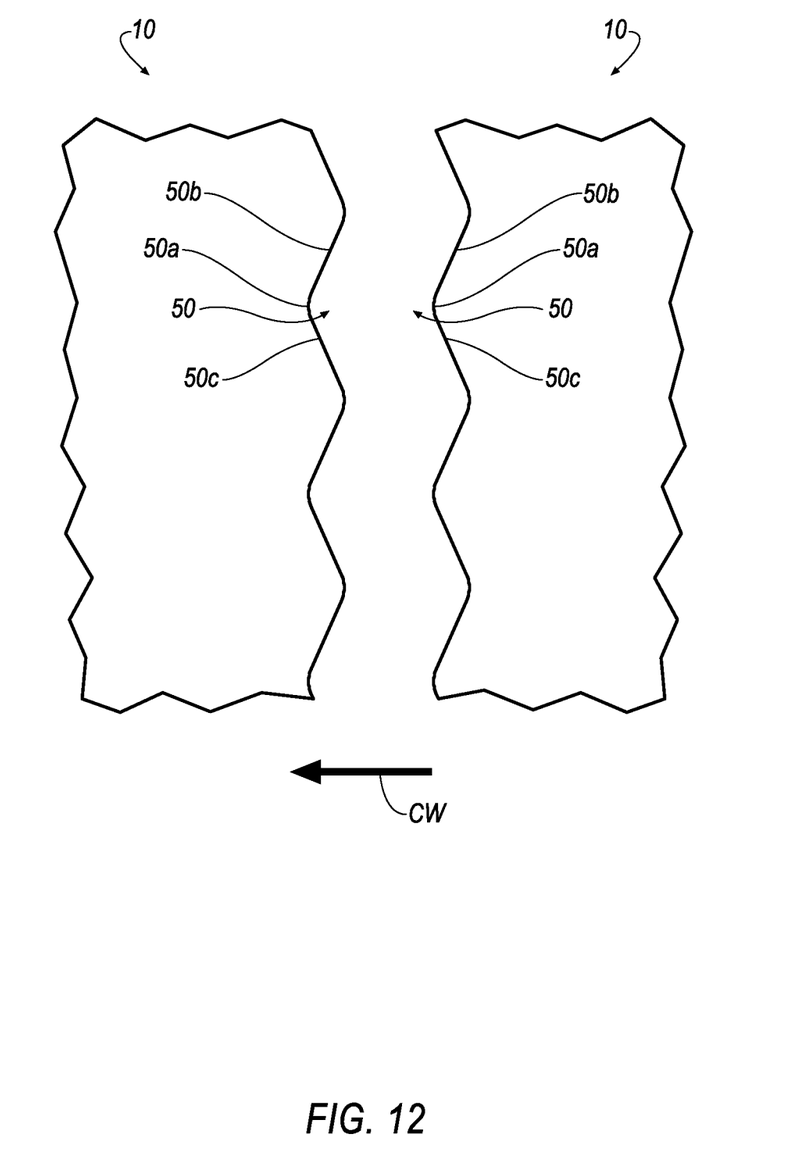
FIG. 12 shows a schematic of the serrations of the cutting insert of FIG. 1 being "in-phase" when mounted in the milling cutter of FIG. 10.

Referring now to FIG. 11, one aspect of the invention is that the serrations 50 on one of the cutting inserts 10 are "in phase" with the serrations 50 on the adjacent cutting insert 10 when the cutting inserts 10 are mounted in the milling cutter 100. As defined herein, the serrations 50 of two adjacent cutting inserts 10 are "in phase" when the apex 50a of the serrations 50 on one of the cutting inserts 10 is aligned with a plane 64 that is substantially perpendicular to the rotary axis, A, and pointing in the same direction as the direction of rotation, CW, with respect to the apex 50a of the serrations 50 on the adjacent cutting insert 10. The "in phase" alignment of the serrations 50 on two adjacent cutting inserts 10 is schematically shown in FIG. 12. As a result of the serrations 50 provide the cutting edges 32, 34, 36, 38 with both a positive axial rake angle and a negative axial rake angle, thereby reducing the likelihood of delamination when machining a composite material.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. An indexable cutting insert for machining composite materials, comprising:
   a top surface, a bottom surface and a plurality of peripheral side surfaces, said top and bottom surfaces and said peripheral side surfaces being joined to form cutting corners, the top surface having a rake face and a central plateau;
   a plurality of cutting edges formed at an intersection between said top surface and plurality of side surfaces; and
   a plurality of triangular-shaped serrations formed in the rake face and extending radially inward from each cutting edge toward the central plateau, each serration comprising an apex and a pair of side surfaces that meet at a vertex, the cutting edge comprising a base of each triangular-shaped serration,
   wherein the serrations on the cutting insert provide the cutting edges with both a positive axial rake angle and a negative axial rake angle, thereby reducing delamination when machining a composite material.

2. The cutting insert according to claim 1, wherein each cutting edge has an equal number of serrations.

3. The cutting insert according to claim 1, wherein each serration is substantially identical to each other.

4. The cutting insert according to claim 1, wherein each serration is in the form of an isosceles triangle.

5. The cutting insert according to claim 1, wherein the vertex of each serration extends inwardly and downwardly from the plurality of cutting edges toward the central plateau at an angle with respect to a plane parallel to the top surface.

6. The cutting insert according to claim 5, wherein the angle is in a range between about one (1) degree to about ten (10) degrees.

7. The cutting insert according to claim 1, wherein the side surfaces of each serration are formed at an angle with respect to each other.

8. The cutting insert according to claim 7, wherein the angle is in a range between about 110 degrees to about 160 degrees.

9. The cutting insert according to claim 1, wherein the rake face extends inwardly and downwardly from the cutting corners and the cutting edges to a substantially planar central plateau at an angle with respect to a plane parallel to the top surface.

10. The cutting insert according to claim 9, wherein the angle is in a range between about five (5) degrees to about twenty-five (25) degrees.

11. A milling cutter comprising a plurality of cutting inserts as recited in claim 1, wherein the serrations of two adjacent cutting inserts are "in phase" with each other when mounted in the milling cutter.

12. An indexable cutting insert for machining composite materials, comprising:
   a top surface, a bottom surface and a plurality of peripheral side surfaces, said top and bottom surfaces and said peripheral side surfaces being joined to form cutting corners, the top surface having a rake face and a central plateau;
   a plurality of cutting edges formed at an intersection between said top surface and plurality of side surfaces; and
   a plurality of triangular-shaped serrations formed in the rake face and extending radially inward from each cutting edge toward the central plateau, each serration comprising an apex and a pair of side surfaces that meet at a vertex, the cutting edge comprising a base of each triangular-shaped serration,
   wherein each cutting edge has an equal number of serrations, and
   wherein each serration is substantially identical to each other, and
   wherein the serrations on the cutting insert provide the cutting edges with both a positive axial rake angle and a negative axial rake angle, thereby reducing delamination when machining a composite material.

13. The cutting insert according to claim 12, wherein each serration is in the form of an isosceles triangle.

14. The cutting insert according to claim 12, wherein the vertex of each serration extends inwardly and downwardly from the plurality of cutting edges toward the central plateau at an angle with respect to a plane parallel to the top surface.

15. The cutting insert according to claim 14, wherein the angle is in a range between about one (1) degree to about ten (10) degrees.

16. The cutting insert according to claim 12, wherein the side surfaces of each serration are formed at an angle with respect to each other.

17. The cutting insert according to claim 16, wherein the angle is in a range between about 110 degrees to about 160 degrees.

18. The cutting insert according to claim 12, wherein the rake face extends inwardly and downwardly from the cutting corners and the cutting edges to a substantially planar central plateau at an angle with respect to a plane parallel to the top surface.

19. The cutting insert according to claim 18, wherein the angle is in a range between about five (5) degrees to about twenty-five (25) degrees.

* * * * *